(12) United States Patent
Eberhardt et al.

(10) Patent No.: US 7,665,873 B2
(45) Date of Patent: Feb. 23, 2010

(54) HEADLAMP FOR VEHICLES

(75) Inventors: Stefan Eberhardt, Backnang (DE); Heinz Redlich, Vaihingen-Enz (DE); Burkhard Leutiger, Karlsruhe (DE)

(73) Assignee: Dr. Ing. h.c. F Porsche AG, Stuttgart (DE)

( * ) Notice: Subject to any disclaimer, the term of this patent is extended or adjusted under 35 U.S.C. 154(b) by 0 days.

(21) Appl. No.: 12/340,010

(22) Filed: Dec. 19, 2008

(65) Prior Publication Data

US 2009/0161382 A1 Jun. 25, 2009

(30) Foreign Application Priority Data

Dec. 21, 2007 (DE) ....................... 10 2007 063 542

(51) Int. Cl.
*B60Q 1/00* (2006.01)

(52) U.S. Cl. ....................... 362/547; 362/294; 362/507; 362/373

(58) Field of Classification Search ................. 362/294, 362/373, 547, 507
See application file for complete search history.

(56) References Cited

U.S. PATENT DOCUMENTS 7,284,882 B2 * 10/2007 Burkholder ................. 362/294
7,338,186 B1 * 3/2008 Wu et al. .................... 362/294
7,488,096 B2 * 2/2009 Childers et al. ............. 362/373
7,513,659 B2 * 4/2009 Vukosic et al. .............. 362/373
7,537,366 B2 * 5/2009 Inoue et al. ................ 362/547
2004/0160772 A1 8/2004 Tatsukawa et al.
2004/0202007 A1 10/2004 Yagi et al.
2007/0076422 A1 * 4/2007 Nicolai ....................... 362/547
2008/0043478 A1 * 2/2008 Wang ......................... 362/373

FOREIGN PATENT DOCUMENTS

DE 102004017454 A1 1/2005
EP 1447617 A2 8/2004

* cited by examiner

*Primary Examiner*—Ali Alavi

(57) ABSTRACT

A headlamp for vehicles has at least one illumination device with one or more light-emitting diodes and with an optical system that is disposed in the light exit area and focuses the light of the light-emitting diodes for a forward lighting of the vehicle. At least one cooling body is provided for dissipating the heat output by the light-emitting diode, and the cooling body contains a number of cooling ribs. To configure the light cone, the cooling body is disposed in the optical axis of the light exit area of the light-emitting diodes between the light-emitting diodes and the optical system, at least the tip of a cooling rib of the cooling body is located at the focal point between the light-emitting diode and the optical system.

5 Claims, 2 Drawing Sheets

HEADLAMP FOR VEHICLES

CROSS-REFERENCE TO RELATED APPLICATION

This application claims the priority, under 35 U.S.C. § 119, of German application DE 10 2007 063 542.9, filed Dec. 21, 2007; the prior application is herewith incorporated by reference in its entirety.

BACKGROUND OF THE INVENTION

Field of the Invention the present invention proceeds from a headlamp for vehicles having at least one illumination device with one or more light-emitting diodes, cooling bodies being provided for dissipating the heat output by the light-emitting diode or diodes.

Such a headlamp is disclosed, for example, in published, non-prosecuted German patent application DE 10 2004 017 454 A1, corresponding to U.S. Pat. No. 7,114,837. In the case of this known device for vehicle illumination that has a headlamp, a number of luminous devices are provided that are arranged according to a predetermined pattern on a holder, the holders having cooling bodies for dissipating the heat produced at the luminous device. Various fitting locations for the cooling bodies are known from the prior art, it being common to all fitting locations that the cooling bodies are provided in a non-visible area and thus behind the arrangement of the luminous device, which usually also have an assigned reflector.

SUMMARY OF THE INVENTION

It is accordingly an object of the invention to provide headlamp for vehicles that overcomes the above-mentioned disadvantages of the prior art devices of this general type, which keeps the construction space of an illumination device with light-emitting diodes and cooling bodies as small as possible. Furthermore, a clear light/dark boundary is to be implemented that meets the requirements of maximum illumination and at the same time exhibits the least possible dazzling of the opposing traffic or of persons at the edge of the roadway.

With the foregoing and other objects in view there is provided, in accordance with the invention, a headlamp for vehicles. The headlamp contains at least one illumination device having at least one light-emitting diode and a light exit area, an optical system disposed in the light exit area and focuses light of the light-emitting diode for a forward lighting of a vehicle, and at least one cooling body for dissipating heat output by the light-emitting diode. The cooling body has a number of cooling ribs each with a cooling tip. The cooling body is disposed in an optical axis of the light exit area of the light-emitting diode between the light-emitting diode and the optical system. At least the tip of one of the cooling ribs of the cooling body is disposed in a region of a focal point between the light-emitting diode and the optical system.

The inventive arrangement of the cooling body in the optical axis of the light exit area of the light-emitting diodes between the light-emitting diodes and the optical system for the purpose of focusing and aligning the light for the vehicle forward lighting has the advantage that the cooling ribs, arranged transverse to the light propagation direction, of the cooling body make possible a very good light/dark boundary.

The light cone can advantageous be defined via an appropriate configuration of the cooling ribs.

An appropriate formation of the tip of the raised cooling rib has the advantage that the color fringe of the light/dark boundary can be influenced depending on the configuration.

Owing to the inventive arrangement, optically active use is specifically made of one or individual cooling ribs, while the further cooling ribs exert no influence on the light distribution, but are at the same time compactly integrated in the package.

Advantageously, the entire cooling body can be displaceably arranged in the direction of the optical axis for focusing purposes. Scattered light is prevented by the active element for the formation of the light distribution, a clear light/dark boundary is implemented, and at the same time effective cooling of the heat output by the light-emitting diode is achieved.

The contour of the cooling rib, and thus the illumination, can be adapted to various traffic situations, for example freeway light, cornering light, town light, by integration of movable elements at the optically active cooling rib, and suitable control devices.

Other features which are considered as characteristic for the invention are set forth in the appended claims.

Although the invention is illustrated and described herein as embodied in headlamp for vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1B:
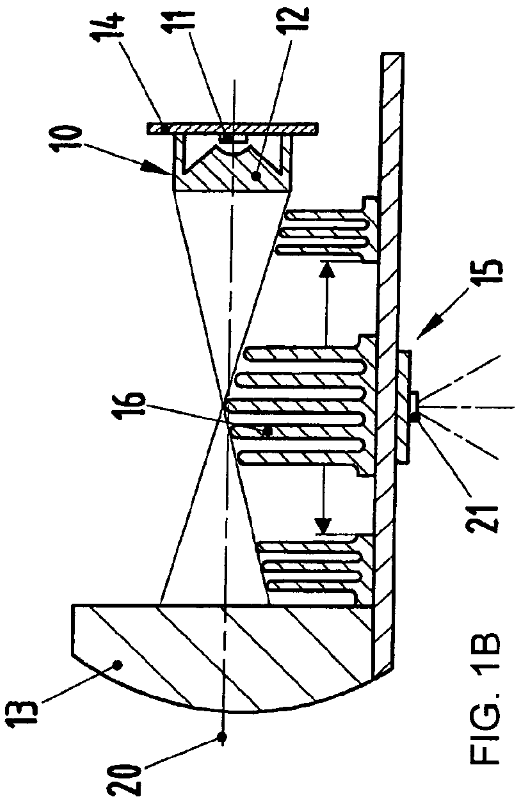
FIGS. 1A, 1B and 1C are diagrammatic, side-sectional views of a section from a headlamp with a luminous device of an associated optical system, and cooling bodies disposed therein according to the invention.
Figure 1C:
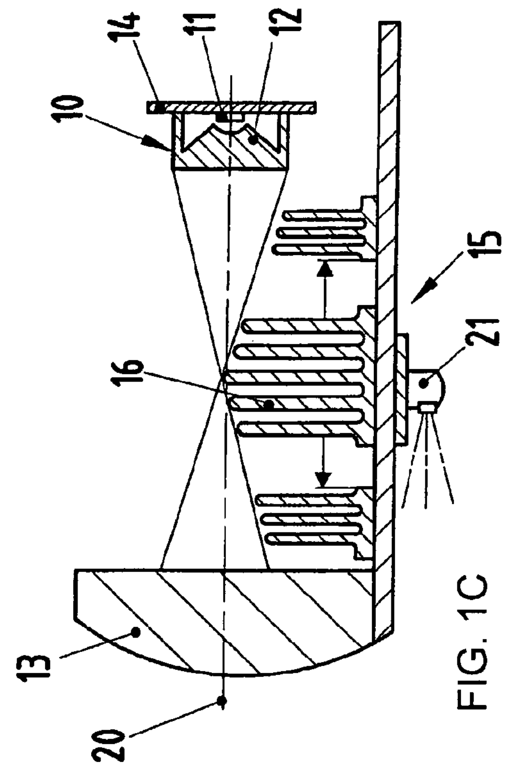
Figure 1A:
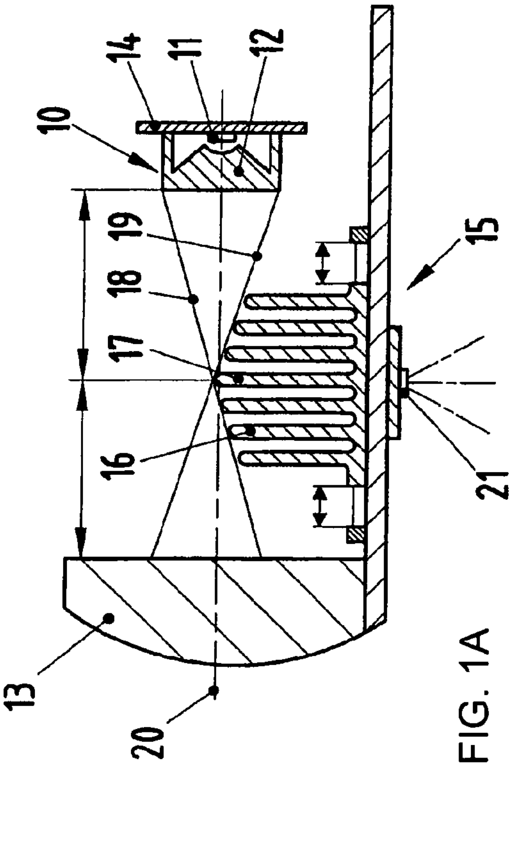

Referring now to the figures of the drawing in detail and first, particularly, to FIGS. 1A, 1B and 1C thereof, there is shown a section from a headlamp, there being shown here for the purpose of illustrating the subject matter of the invention only an illumination unit 10. The illumination unit 10 contains a light-emitting diode 11, which has a supplementary optical system 12, if appropriate, and of a further optical system 13 and the inventively arranged cooling body 16, which absorbs the heat of a further light-emitting diode 21. Of course, this arrangement is arranged in a headlamp formed from a housing and a transparent cover plate, but this is not to be explained explicitly, since the principle of the construction of a headlamp with a housing, a transparent cover plate, an illumination unit and an reflector is general prior art.

It is already known from the prior art that the temperature arising at a light-emitting diode must be dissipated via suitable cooling bodies. The problem of cooling, and the interconnection of light-emitting diodes for optimum dissipation of heat is therefore not to be explained explicitly.

In the case of the inventive arrangement illustrated, the cooling body 16 is introduced in the visible area of the headlamp between the illumination unit 10, formed of the light-emitting diode 11 and supplementary optical system 12 and the optical system 13, and is additionally used with reference to its cooling function for the light-emitting diode 21 as a formation arrangement for the light distribution of the illumination unit 21.

In the exemplary embodiment illustrated, it may be seen that the cooling body 16 contains a number of cooling ribs. The cooling ribs are of various heights, the height of these cooling ribs being oriented to the light cone of the illumination unit 10. One cooling rib 17 is pulled forward so far by comparison with the other cooling ribs that it is used for light shaping. The cooling rib 17 therefore reaches with its tip into the area of the focal point of the light source 11 with its supplementary optical system 12, as is to be seen in the side view of FIGS. 1A, 1B and 1C. This is indicated for the purpose of illustration by lines 18 and 19 that intersect at the focal point and at the same time specify schematically the propagating light cone. It is possible to arrange the cooling body 16 in a displaceable fashion along the optical axis 20 for the purpose of focusing. It is possible here to conceive both a mechanical and an electrical adjustment that is coupled to the light control unit.

Figure 2:
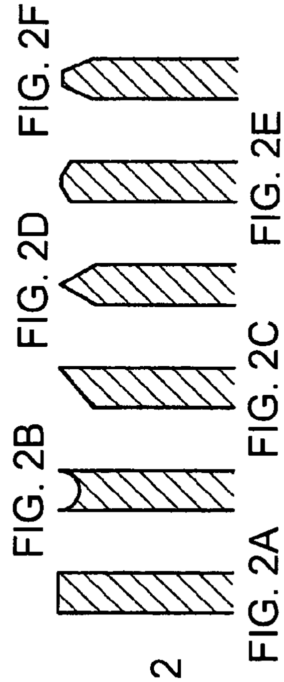
FIGS. 2A-2F are diagrammatic, side views showing various options for the formation of a tip of a cooling rib of the cooling body.

FIGS. 2A-2F shows various possibilities of shaping the tip of the cooling rib 17. FIG. 2A shows a rectangular terminal shape, FIG. 2B a concave one, FIG. 2C one which tapers obliquely, FIG. 2D a pointed one, and FIGS. 2E and 2F respectively show a slightly compressed tip, although substantially more shaping variants are, however, possible. The color effect at the light/dark boundary is influenced by the shaping of this tip of the cooling rib 17. Depending on the shaping of the cooling tip, the light fans out in accordance with its interference behavior on the basis of the laws of optics.

Figure 3:
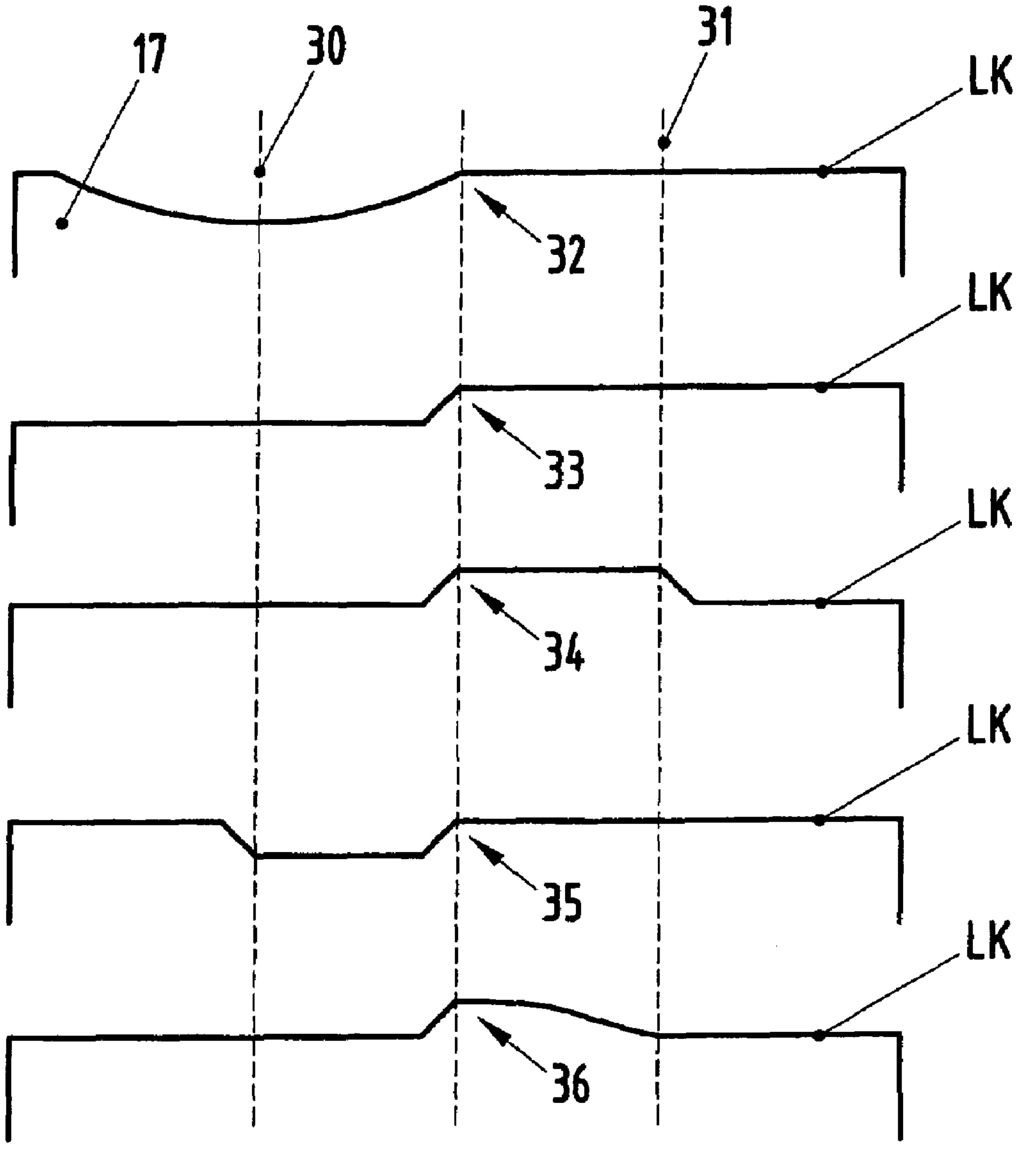
FIG. 3 is a diagrammatic, plan view of the cooling body in the optical axis of the light.

FIG. 3 shows the cooling body 16, or the cooling rib 17, in a plan view of the light course, that is to say along the optical axis. The reference symbol LK, standing for light edge, here denotes the upper terminal edge, which influences the propagation of the light in accordance with its shaping. The optically active area is thereby specified between the lines 30 and 31. A variety of shaping variants are provided here in order to implement the passing beam and highway beam, it also being possible to design the cooling rib in an adjustable fashion transverse to the axis. The areas for edge illumination can thereby likewise be set by the cooling rib or the cooling body.

The invention claimed is:

1. A headlamp for vehicles, the headlamp comprising:

at least one illumination device having at least one light-emitting diode and a light exit area;

an optical system disposed in said light exit area and focuses light of said light-emitting diode for a forward lighting of a vehicle; and at least one cooling body for dissipating heat output by said light-emitting diode, said cooling body having a number of cooling ribs each with a cooling tip, said cooling body disposed in an optical axis of said light exit area of said light-emitting diode between said light-emitting diode and said optical system, and at least said tip of one of said cooling ribs of said cooling body being disposed in a region of a focal point between said light-emitting diode and said optical system.

2. The headlamp according to claim 1, wherein a formation of a light distribution is influenced by said one cooling rib in accordance with a configuration of said one cooling rib.

3. The headlamp according to claim 2, wherein in a sectional illustration said one cooling rib relevant for the light distribution has various tip shapes that implement an improvement of color effects at a light/dark boundary.

4. The headlamp according to claim 1, wherein said cooling body is displaced along the optical axis between said illumination element and said optical system.

5. The headlamp according to claim 1, wherein said one cooling rib is an optically active cooling rib being adjusted to adapt an illumination to various traffic situations.

* * * * *